Oct. 4, 1955 F. J. REED ET AL 2,719,884

EQUIPMENT FOR USE WITH MAGNETIC TAPE RECORDS

Original Filed June 24, 1949 4 Sheets-Sheet 1

INVENTORS
Frank J. Reed
Lloyd J. Bobb
BY
ATTORNEYS

EQUIPMENT FOR USE WITH MAGNETIC TAPE RECORDS

Original Filed June 24, 1949 4 Sheets-Sheet 2

INVENTORS
Frank J. Reed
BY Floyd J. Bobb
ATTORNEYS

Oct. 4, 1955 F. J. REED ET AL 2,719,884
EQUIPMENT FOR USE WITH MAGNETIC TAPE RECORDS
Original Filed June 24, 1949 4 Sheets-Sheet 3
Fig. 5.
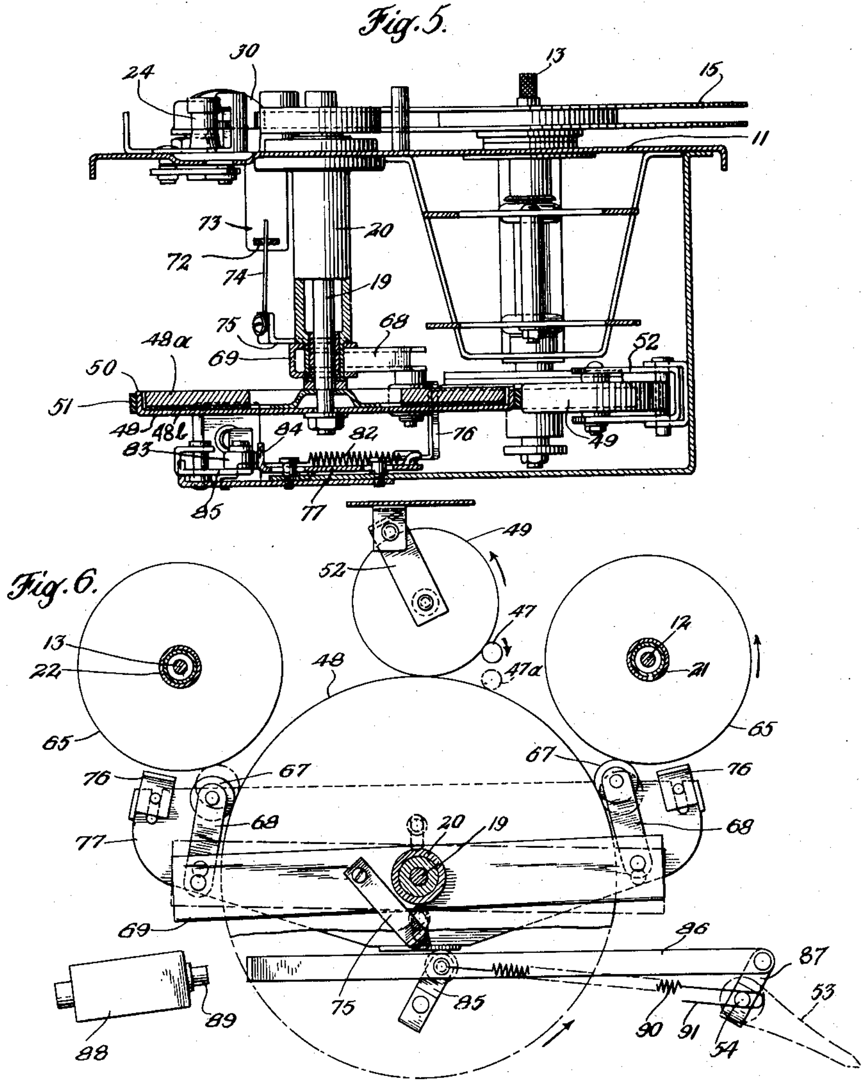
Fig. 5, Fig. 6
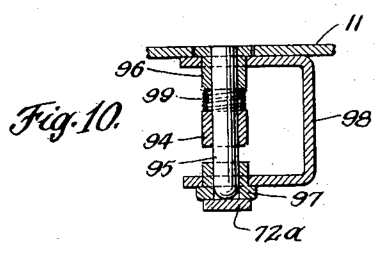
Fig. 10
INVENTORS
Frank J. Reed
BY Lloyd J. Bobb
ATTORNEYS Oct. 4, 1955 F. J. REED ET AL 2,719,884

EQUIPMENT FOR USE WITH MAGNETIC TAPE RECORDS

Original Filed June 24, 1949 4 Sheets-Sheet 4

INVENTORS
Frank J. Reed
Lloyd J. Bobb
BY

ATTORNEYS

United States Patent Office 2,719,884

Patented Oct. 4, 1955

2,719,884

EQUIPMENT FOR USE WITH MAGNETIC TAPE RECORDS

Frank J. Reed, Philadelphia, and Lloyd J. Bobb, Glenside, Pa., assignors to The International Electronics Company, Philadelphia, Pa., a corporation of Pennsylvania Original application June 24, 1949, Serial No. 101,053, now Patent No. 2,675,973, dated April 20, 1954. Divided and this application January 18, 1954, Serial No. 405,203

5 Claims. (Cl. 179—100.2)

This invention relates to equipment for use with magnetic tape records and is especially concerned with a machine of the general type disclosed in our copending application, Serial No. 11,994, filed February 26, 1948, issued August 17, 1954, as Patent No. 2,686,845.

The general type of machine disclosed in said prior application and with which the present invention is also concerned incorporates a pair of reel mounting shafts adapted to carry a pair of tape reels between which a tape record is adapted to be fed. Preferably the machine is arranged to feed the records first in one direction and then in the reverse direction, the two directions of feed being accompanied by scanning of different side-by-side tracks on the tape record, so that upon the conclusion of playing of two tracks of a given record, the record is rewound and ready for another playing. In a machine of this character it is contemplated that the length of tape employed on a given reel and the speed of scanning be such as to record and playback for a considerable time, for instance, one hour.

Recording tape suitable for use in such a machine comprises paper or plastic tape carrying a coating on one side thereof with finely divided particles of magnetizable material dispersed therein.

Additional general features of machines of this type include tape threading mechanism whereby to simplify the operation of threading a tape into the machine, drive mechanism for the reels and also a tape driving capstan adapted to engage a tape in the path of feed between the reels, the reel drive and capstan drive being arranged to provide for both forward and reverse operation. Mechanism for applying braking force to the reels when the machine is stopped is also provided.

The invention is concerned with a machine of the general character briefly outlined above and various features of the invention are concerned with providing stability and accuracy of tape feed and tape handling in the operation of the machine, while at the same time avoiding excessive strains on the tape, such as might lead to tape damage or breakage. Various of the individual drive, threading, control, brake and other mechanisms of the machine contribute to these general purposes, as will be brought out more fully hereinafter. The way in which the features of the invention contribute to the purposes just mentioned can best be explained in association with a description of the structural arrangement of the preferred embodiment of the machine as shown in the drawings—

Figure 5 is a vertical sectional view taken substantially as indicated by the line 5—5 on Figure 1;

Figure 6 is a view taken substantially as indicated by the line 6—6 on Figure 4, with certain parts in a different adjusted position, as will further appear;

Figure 10 is a vertical sectional view of certain of the mounting parts for the scanning head taken as indicated by the line 10—10 on Figure 1.

Figure 1:
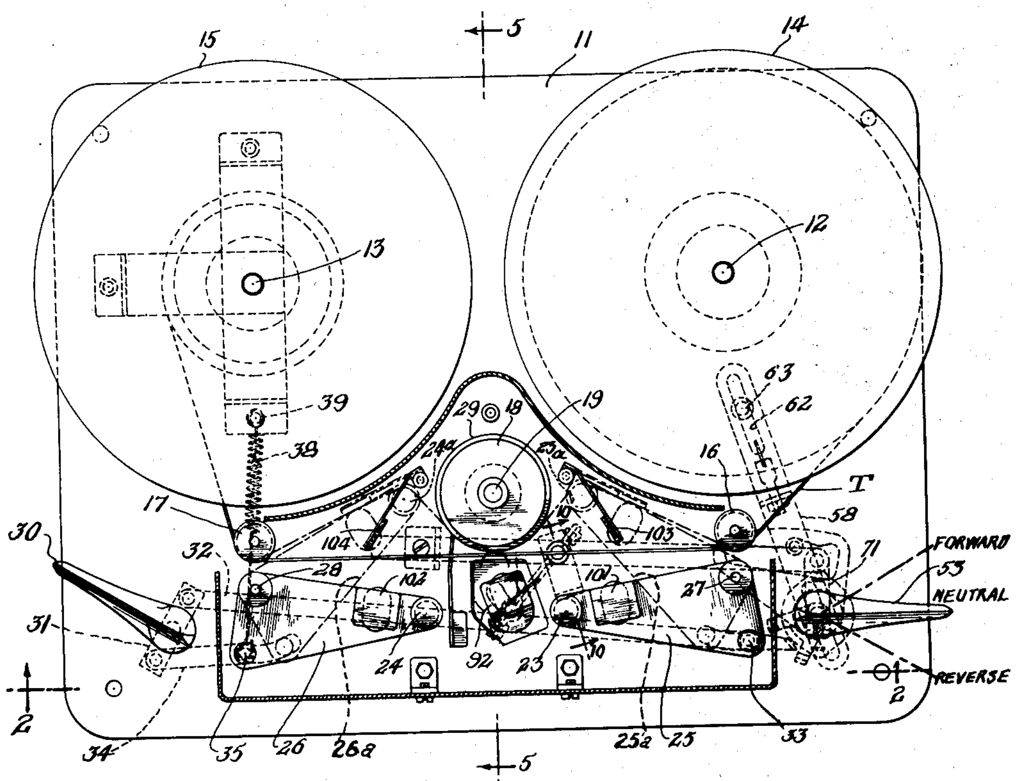
Figure 1 is a plan view of a machine constructed according to the present invention, with certain upper enclosure parts cut away to better show important operating parts.

As best seen in Figures 1 to 5 inclusive, the machine is provided with a main mounting or base plate 11 which serves to carry the reel mounting shafts and other parts, as described below. A pair of reel mounting shafts are indicated at 12 and 13. The shaft 12 is adapted to mount a reel indicated at 14 and this reel stands in the position of the reel carrying a record being started in the machine either for recording or for playback. The tape, such as indicated at T is wound on the reel 14 with the coated side presented outwardly and the tape is fed from this reel through the mechanism described below to the reel 15 mounted on the spindle 13, the reel 15 occupying the position of a take-up reel during forward operation of the machine. During reverse operation, the reel 14 occupies the position of a take-up reel. A pair of guide posts 16 and 17 define a portion of the path of feed of the tape between the reels and from Figure 1 it will be noted that the tape path passes close to the tape driving capstan 18 which is mounted on a shaft 19. Vertically spaced bearings are provided for shaft 19 in the surrounding sleeve 20 which is fastened at its upper end to the mounting plate 11 (see particularly Figure 5). Similar vertically spaced bearings are carried by sleeves 21 and 22 associated with the reel shafts 12 and 13 (see particularly Figures 3, 4 and 6).

The tape is adapted to be brought into driving engagement with the capstan 18 by means of a pair of guide elements 23 and 24 which are carried on arms 25 and 26 pivoted respectively at 27 and 28, so that these guide elements may be shifted between the full-line position shown in Figure 1 and the dotted-line position (**23*a* and 24*a*) also shown in Figure 1. In the latter positions (23*a* and 24*a*), the tape is retained in engagement with a substantial portion of the periphery of the capstan 18 and preferably this capstan is provided with a friction surfacing material, such as the rubber indicated at 29** in Figure 1.

The tape threading control arms 25 and 26 are adapted to be moved between the threading position (Tape-Out—full-line showing in Figure 1) and the operating position (Tap-In—dotted-line position of Figure 1) by means of a threading control lever indicated at 30. The mounting shaft for this lever 30 carries a double-ended lever 31 one end of which is connected by a link 32 with a pin 33 which is fastened to the threading arm 25, and the other end of which lever is connected by a link 34 with a pin 35 secured to the other threading arm (26). Attention is now called to the fact that the two pins 33 and 35 work in arcuate slots 36 and 37 provided in the base plate 11 (see particularly Figures 1, 7 and 8). A spring 38 anchored at 39 is attached to the pin 35 and acts to retain the arms 25 and 26 in either position of adjustment. Thus, as will be seen from comparison of Figures 7 and 8, the line of action of the spring 38 in one position of adjustment lies to one side of the pivot 28 of arm 24 and in the other position of adjustment lies to the opposite side of the pivot 28.

Attention is now further directed to the fact that the two arcuate slots 36 and 37 are of different length, the slot 36 being somewhat shorter than slot 37. This is provided so that the movement of both of the tape threading arms is limited by engagement of the pin 33 with the opposite ends of the slot 36, the pin 35 remaining out of engagement with the ends of slot 37 in both positions of adjustment. By virtue of this arrangement and by virtue of the spring 38 acting on the pin 35, the spring eliminates all lost motion or "slop" in the linkage interconnecting the arms 25 and 26 and this feature is of great importance in accurately maintaining the position of the guide elements 23 and 24, especially in the operating position where the tape is retained in engagement with the capstan 18. This arrangement has been found to greatly reduce flutter of the guides and correspondingly reduce inaccuracies in tape feed.

Figure 3:
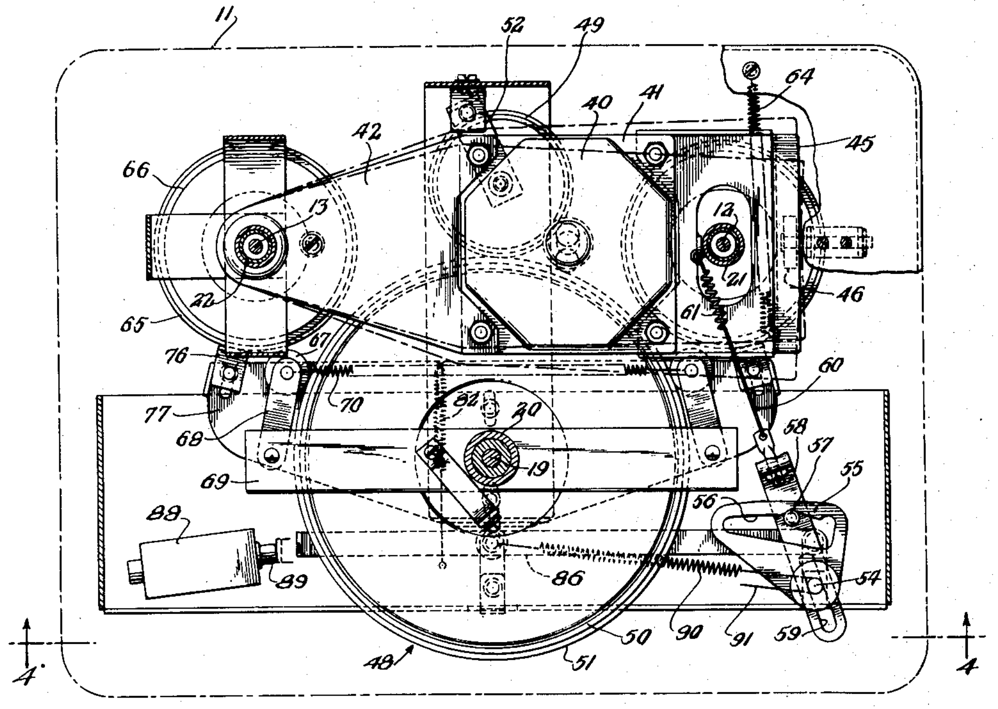
Figure 3 is a horizontal sectional view taken as indicated by the line 3—3 on Figure 4.
Figure 4:
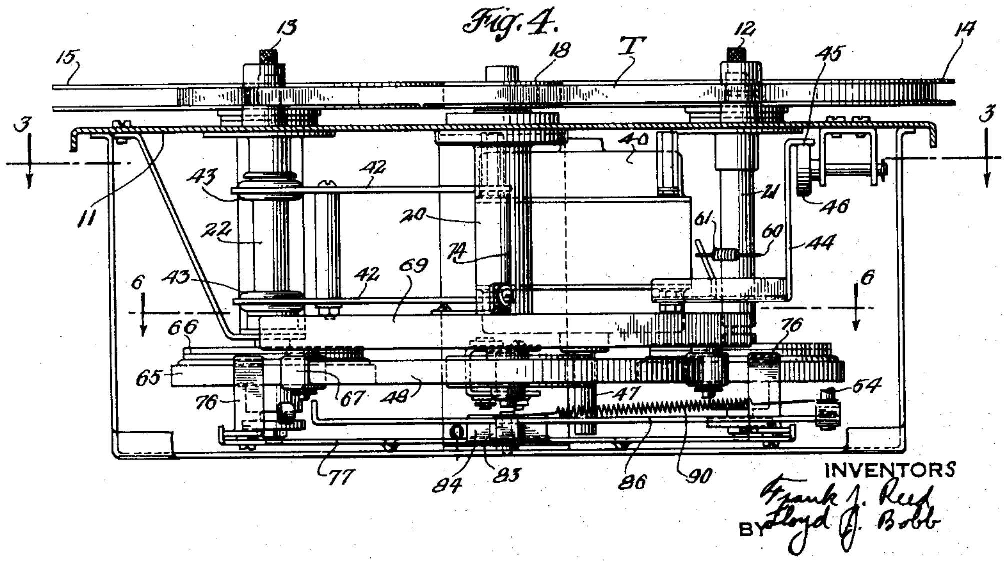
Figure 4 is a view taken in a vertical plane as indicated by the line 4—4 applied to Figure 3.

For purposes of operating the machine a driving motor 40 is provided, this motor being carried by a motor supporting frame 41 including upper and lower mounting plates projecting therefrom toward the left when viewed as in Figures 3 and 4 as shown at 42—42. These plates are provided with apertured ends mounted on the sleeve 22 surrounding the reel spindle 13, rubber mounts 43 being provided for this purpose. At the opposite end of the motor mount a bracket 44 is provided, being extended from the motor mount horizontally and thence upwardly and provided with a horizontal flange 45 adapted to ride on a rubber roller or the like 46. This motor mount provides freedom for pivotal or shifting movement of the motor so that the motor shaft 47 may alternatively be brought into engagement either with the capstan driving wheel 48 or with the idler wheel 49 (see particularly Figures 3, 4, 5 and 6). In Figure 6 the motor shaft 47 is shown in full lines in engagement with the idler 49 and in dotted lines at **47*a* in engagement with the capstan driving wheel 48. The capstan driving wheel as best seen in Figure 5 is connected with the lower end of the capstan shaft 19 and is provided with an upturned flange 50 carrying a rubber tire 51 externally thereof. The idler 49 is pivotally mounted by means of a swinging bracket 52** and this idler is also desirably rubber lined.

From the above it will be seen that in one position of adjustment of the motor the drive is transmitted directly from the motor shaft to the capstan driving wheel whereas in the other position of adjustment the drive is transmitted through the idler 49 to the capstan driving wheel, thereby effecting reverse operation of the capstan.

Shifting movement of the motor mount is effected by a control lever 53 mounted on the reversing control shaft 54. This shaft (see particularly Figures 2 and 3) carries a cam latch element 55 having a cam surface 56 cooperating with a follower roller 57 projecting from the strap 58, which strap has a slot 59 engaging the shaft 54. Strap 58 is connected by means of a link 60 with the motor mount, the link incorporating a spring 61 as shown in Figure 3. As appears in Figure 1, the strap 58 also has a slot 62 toward its other end cooperating with a pin 63 mounted on a fixed part. This cam and linkage mechanism is not a part of the present invention per se, being fully disclosed and claimed in the copending application of Burnham E. Stone, Serial No. 19,913, filed April 9, 1948, issued January 19, 1954, as Patent No. 2,666,593, and assigned to the assignee of the present invention. The nature of operation of this mechanism and its relation to certain other features of the invention is described herebelow, but it is here briefly mentioned that upon movement of the reversing control lever 53 to the Forward position indicated in Figure 1, the link 60 acts to pull the motor mount so as to engage the motor shaft 47 with the capstan driving wheel 48 as shown in Figure 6 at **47*a*, movement of the lever 53 to the reverse position providing for opposite shifting movement of the motor mount under the influence of the spring 64, so as to bring the motor shaft 47 into engagement with the idler 49**. In this way reversal of direction of drive of the capstan is provided.

The motor 40 also serves to drive the reels for purposes of tape take-up. The reel drives are similar to each other and therefore only one of them need be described. Referring to Figures 3, 4 and 6, each reel spindle (for instance the left hand spindle when viewed as in Figures 3, 4 and 6 carries a driving wheel 65, desirably rubber lined which is connected with the reel spindle itself through a friction clutch 66 of the kind more fully disclosed in copending application of Daniel H. Dashiell and Lloyd J. Bobb, Serial No. 11,995, filed February 28, 1948, issued August 17, 1954, as Patent No. 2,686,637, and assigned to the assignee of the present application. An idler 67 is adapted to interconnect the wheel 65 with the capstan driving wheel 48. The two idlers 67—67 (see Figure 6) are each mounted on an arm 68, which arms are pivoted to opposite ends of an oscillatable beam 69 which is journaled coaxially of the capstan driving wheel 48 (see also Figure 5). The idlers are drawn toward the capstan driving wheel 48 by means of a spring 70 (see Figure 3). Shifting movement of the beam 69 to bring one or the other of the idlers 67 into engagement is also controlled by the reversing control 53. For this purpose the reversing control shaft 54 carries an arm 71 (see Figure 1) to which a push-pull member 72 is connected, the free end of this member being slidable in a slot formed in the supporting bracket 73. A spring finger 74 is connected with a bracket 75 projecting from the beam 69, the finger being extended upwardly and engaged in an aperture formed in the push-pull member 72 (see Figures 2, 5 and 6). In operation when the control lever 53 is moved to the Forward position, the left hand idler 67 is engaged and the right hand idler 67 is disengaged so that the tape is properly taken up on the reel 15. In the Reverse position, the left hand idler 67 is disengaged and the right hand idler 67 is engaged, whereupon reel 14 becomes the take-up reel.

Figures 8, 9:
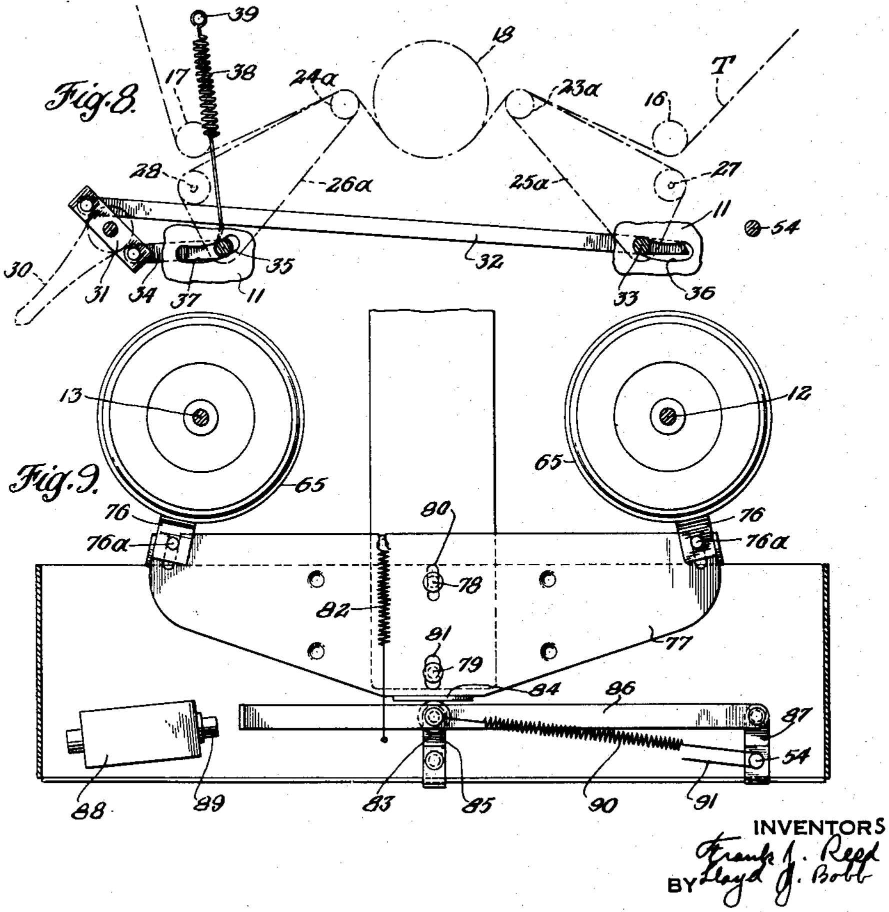
Figure 8 is a view similar to Figure 7, illustrating certain portions of the parts shown in Figure 7, but in a different position of adjustment.
Figure 9 is a plan view of the brake mechanism for the tape reels.

The reversing control shaft 54 is still further utilized for control of the reel brakes. As best seen in Figure 9, these brakes indicated at 76—76 are carried by an equalizer or beam 77 which is mounted by means of pins 78 and 79 working in slots 80 and 81 formed in the beam itself. At least slot 81, and both slots if desired, are of greater width than the cooperating pin, so that the beam may oscillate in a sense to equalize the brake applying force of the two brakes 76—76. The beam is shiftably movable toward and away from the reel driving wheels 65—65, a return spring 82 serving to draw the beam away from the wheels. Application of the brakes is effected by the action of a roller 83 abutting against an upright pad 84 formed on the beam 77, the roller being pivotally carried by an arm 85 so that it may move to either side of the position shown in Figure 9, for instance to the position shown in Figure 6. Movement of the arm 85 is effected by a link 86 which is connected to an arm 87 fixed on the reversing shaft 54 and therefore controllable by the control lever 53. By this arrangement in either operating position of adjustment of the control 53, the brakes are released although in the Neutral position the brakes are both applied (compare Figures 6 and 9).

The brake elements themselves indicated at 76 are adjustably mounted by means of screws **76*a* cooperating with slots formed in the brake equalizing beam 77. In this way the brakes are adjustable toward and away from the wheels 65**.

The machine is also adapted to be automatically reversed, for which purpose a metal foil sticker may be applied to the tape at the desired reversing point, in accordance with the disclosure of the copending application of Frank J. Reed, Serial No. 300,247, filed July 22, 1952, and assigned to the assignee of the present application, and also in accordance with the disclosures of Applications 11,994 and 11,955 above identified. Such a metal foil sticker is adapted to cooperate with switch elements incorporated in the guide post 16 and thereby serve to control operation of the solenoid indicated at 88 in Figure 9. The armature 89 of this solenoid is adapted to strike the left hand end of the link 86, to thereby shift the link from the left hand position (corresponding to Forward position of control lever 53) whereupon the springs associated with the motor mount and the cam surface 56 act to turn the control lever 53 from the Forward position through the Neutral position to the Reverse position. This motion of the control 53 is biased by means of the spring 90 shown in Figures 3, 6 and 9, the spring being connected with the arm 85 and having an elongated loop 91 adapted to engage the control shaft 54. In Figure 6 the parts are shown in the positions corresponding to the Reverse operating position of the control lever 53 and in Figure 9 the parts are shown in the Neutral setting. From comparison of these figures it will be seen that upon movement of the parts from the position shown in Figure 9 to the position shown in Figure 6, the bias spring 90 exerts no tendency to move the arm 85. However, when the control lever 53 is in the Forward position, the link 86 is moved to the left to bring its extreme end into close proximity to the armature 89 of the solenoid 88, and this tensions the bias spring 90 so that upon tripping of the solenoid, the bias spring is effective throughout the initial portion of the movement of the parts, i. e., from the positions corresponding to Forward adjustment of the control handle to the Neutral setting. Because of the shape of the cam latch device described above and disclosed more fully in copending application Serial No. 19,913, fully identified above, upon tripping of the solenoid 88 and movement of the parts to the Neutral position represented by Figure 9, the momentum of the parts together with the action of the motor return spring 64 carries them through the Neutral setting to the position indicated in Figure 6 in which the motor shaft 47 is in engagement with the idler 49. The employment of a bias spring acting through only a portion of the stroke reduces shock to the parts while at the same time ensuring prompt initiation of reversal, which is of importance in order to minimize disruption of the recording or playback at the time of reversal.

Figure 2:
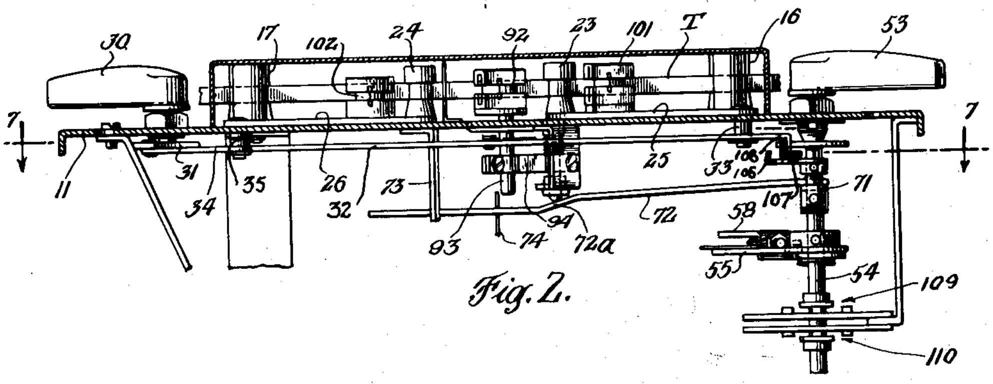
Figure 2 is a vertical sectional view taken substantially as indicated by the line 2—2 applied to Figure 1.
Figure 7:
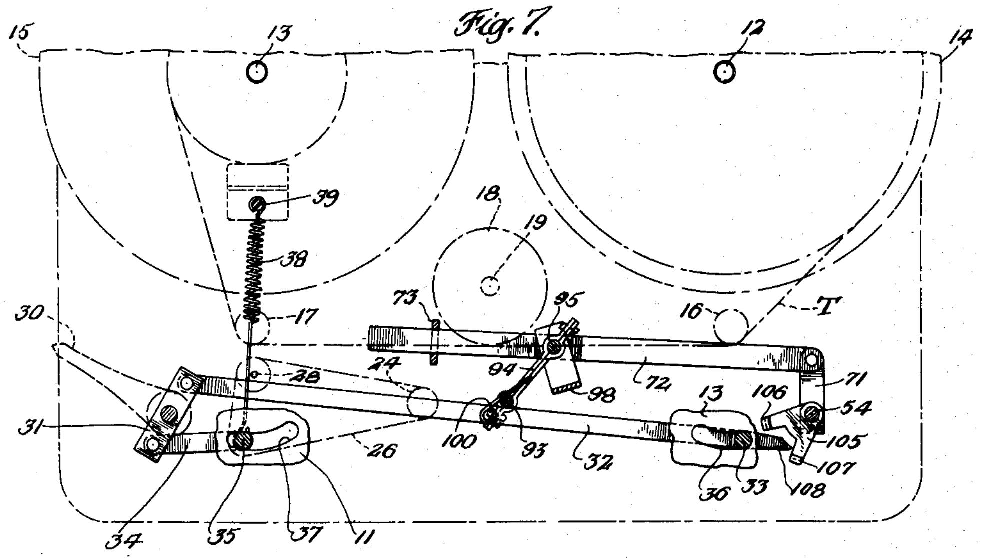
Figure 7 is a view taken substantially as indicated by the line 7—7 on Figure 2.

The recording head is shown at 92 in Figures 1 and 2, this head being mounted on an upright supporting pin 93 which is clamped between a pair of straps 94, the straps also serving to engage a mounting pivot 95 (see Figures 2, 7 and 10). The pin 95 is rotatable and vertically movable in upper and lower bearing sleeves 96 and 97 carried by the bracket 98. A helical spring 99 reacts against the straps 94 and serves to urge the head mounting parts downwardly to the position in which the lower surfaces of the straps 94 abut the upper surface of the sleeve 97. This spring is also arranged to normally urge the recording head to swing inwardly, to bring the pole pieces against the tape riding on the capstan 18.

The recording head is displaceable out of engagement with the tape, i. e., to the full-line position shown in Figure 1, by means of a spring finger 100 which is secured to the link 32 constituting a part of the linkage interconnecting the tape threading arms 25 and 26. The spring finger 100 projects from the link 32 in position to engage the mounting pin 93 and as the link 32 moves to the right when viewed as in Figure 7, this finger swings the recording head away from the capstan about the axis of the pin 95.

As shown in Figures 1 and 2, erasing heads 101 and 102 are mounted respectively on arms 25 and 26, one of these heads (101) being located at an elevation higher than the other (102) so as to come into registry with the upper track to be recorded on the tape. The other head registers with the lower track. When the left hand or threading control lever 30 is moved to swing the arms 25 and 26 to their inner positions as shown in dotted lines at **25*a* and 26*a* in Figure 1, the erasing heads are brought into engagement with the tape against spring pressed backing pads 103 and 104**. These pads ensure intimate engagement of the erasing heads with the tape.

An interlock is also provided between the two control levers 30 and 53, as best shown in Figures 2 and 7. This interlock comprises a device 105 fixed to the control shaft 54 and having projecting fingers with latch elements 106 and 107 adapted to cooperate with the complementary latch element 108 projecting from the adjacent end of the link 32. This interlock arrangement forms no part of the present invention per se, being fully described and claimed in copending application of Burnham E. Stone, Serial No. 24,716, filed May 3, 1948, issued January 12, 1954, as Patent No. 2,665,855, and assigned to the assignee of the present application. It is here briefly pointed out, however, that the interlock prevents movement of the control lever 30 from the full-line position of Figure 1 (Tape-Out position) to the tape threading position (corresponding to the dotted line showing of the threading arms at **25*a* and 26*a* in Figure 1) whenever the reversing control arm 53 is in either of its operating positions. However, when the control 53 is in the Neutral position the control 30 may freely be moved in the sense just described. The control 30, moreover, may be freely moved from the Tape-In position to the Tape-Out position with the control 53 in any position. During this latter movement, if one of the latch elements 106 and 107 is in the path of movement of the cooperating latch element 108, the latch 108** merely rides up over the lower latch element.

The control shaft 54 still further operates a switch 109 shown in Figure 2, which serves as a shut-off switch for the motor 40, the motor circuit being broken whenever the control 54 occupies the Neutral position, but being energized in the two operating positions. Another switch 110 carried by the control shaft 54 is used to switch the erasing current from one of the erasing heads to the other, so as to effect erasure in only one track at a time, it being contemplated that this switch be connected so that when the recording is being made on the upper track, that track is erased just ahead of the engagement of the recording head 92 and so that when the recording is being made on the lower track that track is erased just ahead of the engagement of the recording head 92 with the lower track.

Vertical shifting movement of the head is effected by the shifting movement of the link 72 which also serves to control the beam 69. For this purpose link 72 has an inclined or cam portion **72*a* (see Figures 2 and 10) adapted to engage the lower projecting end of the mounting pin 95 for the recording head. In this way the recording or playback head 92** is automatically shifted from one track to the other on the tape, according to the direction of feed of the tape.

Before describing various of the operations of the machine attention is also directed to the illustration in Figure 5 of an annular flywheel weight **48*a* which is nested within the peripheral flange of the capstan driving wheel. This flywheel weight may if desired be fixedly secured to the driving wheel, although as shown in Figure 5 it is contemplated that such a flywheel weight may rest upon a friction pad such as indicated at 48*b*, for instance a felt pad, so as to provide freedom for rotational movement of the flywheel weight with respect to the capstan driving wheel. This arrangement will cushion the shock of the inertia effect upon the tape in engagement with the capstan, when reversal takes place or when the control lever 53** is moved from one position to another.

In considering the operation of the mechanism described above it should first be kept in mind that it is intended that the equipment be used in association with an amplifier and other appurtenances, such as a loud speaker, a microphone, and a radio receiver, if desired, from which material may be recorded. It will be understood further that the scanning head 92 would be connected to the output of the amplifier when a recording is being made, the signal to be recorded being fed to the input of the amplifier. For playback, the recording-playback head 92 is switched to the input of the amplier and a speaker is connected with the output. It should further be understood that the amplifier circuits desirably include provision for generating an erasing current which may alternatively be fed to the erasing heads 101 and 102, according to the adjustment of the switch 110 by the reversing control lever 53. A circuit which may be used for recording and playback and for the generation of an erasing current is described in the copending application of Lloyd J. Bobb, Serial No. 787,644, filed November 24, 1947, issued June 9, 1953, as Patent No. 2,641,655, and assigned to the assignee of the present application.

Bearing in mind that the equipment herein illustrated and described is used in association with electronic equipment such as mentioned just above, the operation is as follows:

Assume first that a recording is to be made. A reel of tape such as indicated at 14 is placed upon the spindle 12 and with the reversing control 53 in the Neutral position as shown in Figure 1 and further with the tape threading control in the Tape-Out position, also shown in Figure 1, the free end of the tape is drawn from reel 14 and dropped between the various guide elements in the position as indicated in Figure 1. The free end is then started on the hub of a blank reel in the position of reel 15 mounted on spindle 13. It is here further assumed that a metal foil reversing sticker has previously been applied to the inner end of the tape wound upon the supply reel 14.

In a typical equipment, it is contemplated that the drive mechanism shall be arranged to rotate the capstan 18 at a speed such as to feed the tape between the reels at one of the standard adopted speeds, for instance 7½" per second. A typical standard reel 14 comprises a spool approximately 7" in diameter carrying approximately 1200' of ¼" wide recording tape.

With the machine threaded as above described, and with the associated amplifier warmed up and an appropriate signal fed to the input of the amplifier, the machine may now be fully conditioned for recording by movement of the threading control lever 30 to swing the arms 25 and 26 to the dotted line positions shown at 25*a* and 26*a* in Figure 1. The reversing control lever 53 is now moved to the Forward position and feed of the tape and recording commences. At this time the spring finger 100 (see Figure 7) is shifted to the left to release the recording head, whereupon spring 99 (see Figure 10) swings the recording head into engagement with the tape against the capstan 18. The erasing heads 101 and 102 are also brought against the tape, being retained in intimate engagement therewith by the backing pads 103 and 104. Movement of the control lever 53 to the Forward position not only completes the motor circuit but in addition this movement actuates the switch 110 for the erasing heads so as to feed the erasing current to the erasing head 101 and disconnect erasing head 102. As recording progresses, the upper track on the tape is erased just in advance of the position of engagement of the head 92 with the tape. At this time head 92 is also riding on the upper track, because of the movement of member 72 to the left when viewed as in Figure 2, so that the camming portion 72*a* of this member raises the pin 95 and thus the recording head.

Movement of the control lever 53 to the Forward position is still further accompanied by shift of the motor to bring the shaft 47 into direct engagement with the periphery of the capstan driving wheel 48. Still further this movement of the lever 53 to the Forward position operates through the spring finger 74 to shift the beam 69 and thereby engage the left hand idler 67 between the capstan driving wheel 48 and the driving wheel 65 for the reel 15. Reel 15 is thereby driven through the slip clutch 66 in order to take up the tape. It will be understood that the drive to the reel 15 (and also to the reel 14 during reverse operation) is effected at a speed sufficient to provide at least some overdrive of the reels with relation to the tape speed as established by the capstan 18. The slip clutches 65 thus maintain slight tension in the tape during operation.

The recording may now continue throughout the time of feed of the tape from the reel 14 to the reel 15.

In considering this feed of the tape it is of especial importance that the tape threading arms 25 and 26 are retained in their inner positions indicated at 25*a* and 26*a* in Figure 1 by spring 38 and the linkage which interconnects the two tape threading arms. Stability of drive is enhanced by virtue of the fact that all lost motion is taken out of the linkage interconnecting the tape threading arms by virtue of the arrangement of the spring to act on one of said arms, while the limiting stops (pin 33 working in slot 36) operate on the other arm.

When the end of the first run of the tape (from reel 14 to reel 15) is approached, the reversing sticker above mentioned engages the switch elements incorporated in the guide post 16 (as more fully described in copending applications 300,247 and 11,994 above identified) and thereby the solenoid 88 is energized with the result that the reversing control shaft 54 and the control arm 53 will automatically be shifted to the reverse position. This reverses the capstan drive and also connects the drive to reel 14 and disconnects the drive to reel 15. This movement still further results in downward shifting of the recording head 92 because of the movement of the member 72 to the right when viewed as in Figure 2. The erasing head switch 110 is also operated to disconnect the erasing head 101 and to connect the erasing head 102, which latter engages the lower track on the tape. The recording may be continued until the tape is all rewound upon reel 14.

It is of especial importance in connection with this matter of reversing and also in connection with the starting and stopping of the machine at any time by manual operation of the control lever 53 that the brakes 76 are also controlled by the lever 53, the brakes being applied whenever the lever is positioned at or passes through the Neutral position and are released whenever the control 53 is in either of the two operating positions. The arrangement of the brakes 76 on the equalizer 77 and the mounting of the equalizer with freedom for at least some oscillating movement results in uniformity of application of the brakes to the two reel drive wheels 65, and this is of importance and advantage in avoiding damage to or breakage of tape which might otherwise occur upon excessive braking of one reel or the other, during automatic reversal or at a time when the control lever 53 is manually operated. The interposition of the reel clutches 66 between the wheels 65 and the respective reel mounting shafts also aids in avoiding subjection of the tape to excessive strains.

Still another feature of the machine which is of importance in avoiding excessive strain in the tape is the arrangement of the guide elements 23 and 24 on the pivoted arms 25 and 26. Whenever an abnormal tension force tends to develop in the tape, that force acts on the guides 23 and 24 in a sense tending to displace the guides from the inner position (23*a* and 24*a*) to the outer position (the full-line showing in Figure 1), and this automatically releases the driving engagement of the tape with the driving capstan 18. For example, if the hand or some object is placed upon or inadvertently engages one of the reels, the driving engagement of the tape with the capstan is released automatically. This same effect will occur in the event that a tape catches upon a reel, for instance the extreme inner end of the tape which is normally threaded into slots or the like in the reel hub at the time the end is started upon the reel. Indeed, for some purposes it may be desired to deliberately fasten the end of the tape upon a reel so that it will not become disengaged, and when this is done the increase in tension which occurs in the tape at the end of the run will automatically throw out the guides 23 and 24 and thus swing arms 25 and 26 to the Tape-Out position (full-line position of Figure 1). Such outward movement of the arms 25 and 26 is accompanied by shifting movement of the link 32 interconnecting the arms and thus of the spring finger 100 and this spring finger as above mentioned displaces the head 92 away from the capstan 18. This is a safety factor of importance, the effect being that whenever tension is abnormally increased in the tape the recording head is disengaged from the tape on the capstan and if the abnormal tension results in tape breakage, continued rotation of the capstan will not result in scraping of the rubber lining of the capstan against the pole pieces of the recording head. Prolonged rubbing of the pole pieces against the rubber lining of the capstan would tend to cut a groove in the rubber lining and thus damage the machine. This, however, is avoided whenever the tension is increased in the tape sufficiently to displace the arms 25 and 26 and thus the recording head.

It is to be noted that when a recording on both tracks of the tape has been completed, the tape is rewound upon the starting reel 14 and therefore no independent rewinding operation is needed. The record thus made is prepared for immediate playback.

The operation for effecting playback is similar with respect to threading of the tape and manipulation of the controls 30 and 53. It will be understood, of course, that upon playback the recording head is switched from the output of the amplifier to the input thereof and this switching is also accompanied by disabling or disconnection of the erasing system.

At any time during either recording or playback the lever 30 may be moved from the Tape-In position (Figure 8) to the Tape-Out position (Figure 1) and whenever this is done high speed winding of the tape may be effected in either direction, since the driving engagement of the tape with the capstan 18 is thereby released and the overdrive of the reels is then effective to obtain a high speed winding. When conditioned in this way, it is of advantage that the recording head is also displaced away from the tape, such displacement avoiding unnecessary abrasion of the coated surface of the tape and also avoiding the reproduction of so-called "monkey talk," i. e., high speed playback of recorded material.

Various of the features referred to above, including especially the arrangement of the linkage between the tape threading arms 25 and 26 and including also the arrangement of the equalized reel brakes are of great importance in providing for stability of drive or feed of the tape while at the same time avoiding excessive shocks to the tape. The mounting of a flywheel weight such as indicated at 48*a* with freedom for rotational movement with respect to the tape driving capstan also contributes to this end, particularly at the time of effecting automatic reversal.

The present application is a division of our copending application Serial No. 101,053, filed June 24, 1949, issued April 20, 1954, as Patent No. 2,675,973. Certain subject matter of the present application, as well as of the parent application Serial No. 101,053, just mentioned, is also disclosed in our prior application Serial No. 11,994, hereinabove referred to.

We claim:

1. Equipment for use with magnetic tape records including in combination with a pair of reels between which a tape record is adapted to be fed, a tape driving capstan and a cooperating guide element relatively movable between a first position establishing driving interengagement between the capstan and a tape and a second position releasing said driving interengagement, a manually operable control for effecting adjustments between said two positions, and a device acting in either position of adjustment to yieldingly retain the manual control in either adjusted setting, and in which construction said guide element is pivotally movable to establish said first and second conditions of adjustment and further including, an erasing head mounted on and movable with the pivoted guide element into and out of engagement with a tape concurrently with establishment and release of driving engagement of the capstan with a tape, and a spring pressed tape backing pad disposed at that side of the tape feed path on which the capstan is located and serving to retain a tape in engagement with the erasing head when the guide element is adjusted to the tape driving position.

2. Equipment for use with magnetic tape records including in combination with a pair of reels between which a tape record is adapted to be fed, a tape driving capstan adapted to engage a tape at one side thereof in the path of feed between the reels, a yielding tape backing pad adapted to engage a tape at the same side of the path of feed, an erasing head mounted at the opposite side of the path of feed of a tape and controllably movable into and out of engagement with a tape in the area engaged by said backing pad, and a magnetic scanning head located opposite to the capstan in position to engage the tape against the capstan and interlinked with the erasing head for conjoint movement therewith into and out of engagement with a tape.

3. Equipment for use with elongated magnetic tape records adapted to be fed in either direction between a pair of reels and to be scanned alternatively on either one of two tracks, elements operatively engageable with the tape in the path of feed between the reels comprising two magnetic heads located along the tape feed path between the reels in spaced relation to each other and offset edgewise of the tape to respectively engage the tape in said two tracks and for each head a cooperating member for retaining the tape in intimate engagement with the respective heads, said heads and cooperating members constituting pairs of elements and the elements of the pairs being relatively movable to establish and release said intimate engagement, and the tape engaging elements further including a reversible tape driving capstan at one side of the tape and cooperating means at the other side, the capstan and the cooperating means being positioned to engage the tape along the feed path between the heads and being relatively movable to alternatively establish and release driving engagement of the tape with the capstan, and common control means for effecting relative movement of the heads and their cooperating members and of the capstan and its cooperating means, the control means having a setting in which both of the heads and their cooperating members are relatively moved to release said intimate engagement with the tape and in which the capstan and its cooperating means are also relatively moved to release driving engagement with the tape, to thereby facilitate threading of a tape in the equipment.

4. Equipment for use with elongated magnetic tape records adapted to be fed in either direction between a pair of reels and to be scanned alternatively on either one of two tracks, elements operatively engageable with the tape in the path of feed between the reels comprising two magnetic heads located along the tape feed path between the reels in spaced relation to each other and offset edgewise of the tape to respectively engage the tape in said two tracks and for each head a cooperating member for retaining the tape in intimate engagement with the respective heads, said heads and cooperating members constituting pairs of elements and the elements of the pairs being relatively movable to establish and release said intimate engagement, and the tape engaging elements further including a reversible tape driving capstan at one side of the tape and cooperating means at the other side, the capstan and the cooperating means being positioned to engage the tape along the feed path between the heads and being relatively movable to alternatively establish and release driving engagement of the tape with the capstan, control mechanism providing alternatively for feed of the tape at normal scanning speed and at a higher rewind speed, said control mechanism being adjustable to provide for relative movement of the capstan and its cooperating means to establish said driving engagement for operation at normal scanning speed and to release said driving engagement for operation at said higher rewind speed, and connections between the control mechanism and the movable elements of the pairs of heads and cooperating members providing for release of said intimate engagement with the tape upon adjustment of the control mechanism to establish operation at said higher rewind speed.

5. A construction according to claim 4 in which the relative movement of the heads and their cooperating members includes a position in which the heads and tape are displaced out of contact with each other and in which the adjustment of the control mechanism to provide operation at the higher rewind speed maintains the heads and tape out of contact with each other.

References Cited in the file of this patent

UNITED STATES PATENTS

| | | |
|---|---|---|
| 2,535,486 | Dank | Dec. 26, 1950 |